June 21, 1927. 1,632,960
O. E. GIESE
FILTER
Filed July 20, 1926  2 Sheets-Sheet 1
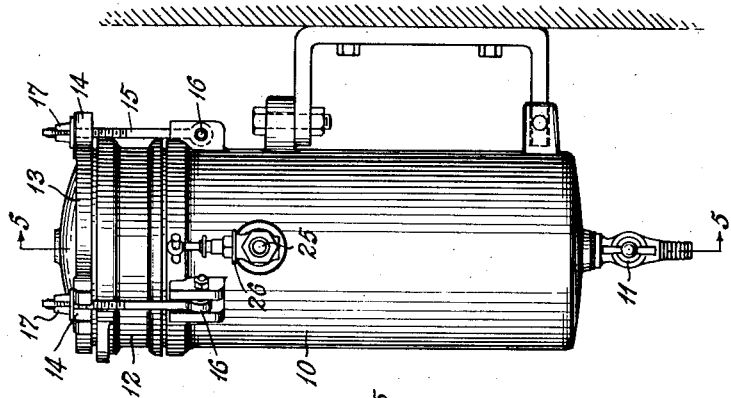
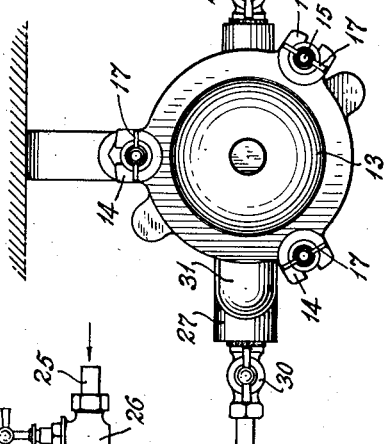
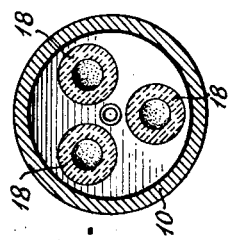
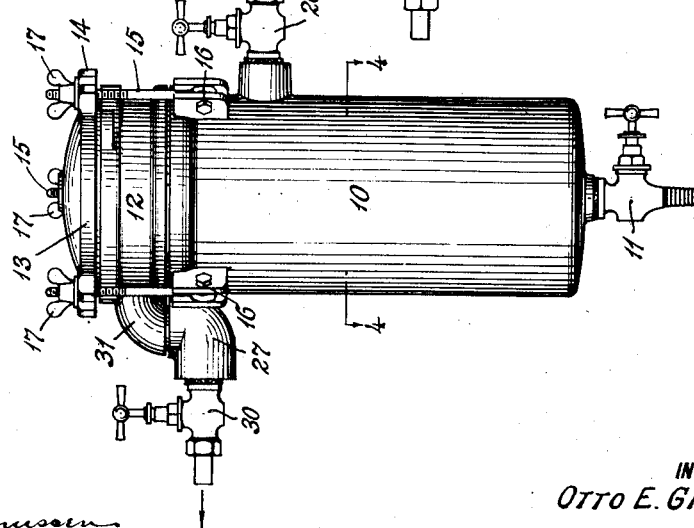
WITNESS
G. V. Rasmussen
INVENTOR
OTTO E. GIESE
BY
ATTORNEYS June 21, 1927.
O. E. GIESE
1,632,960
FILTER
Filed July 20, 1926
2 Sheets-Sheet 2
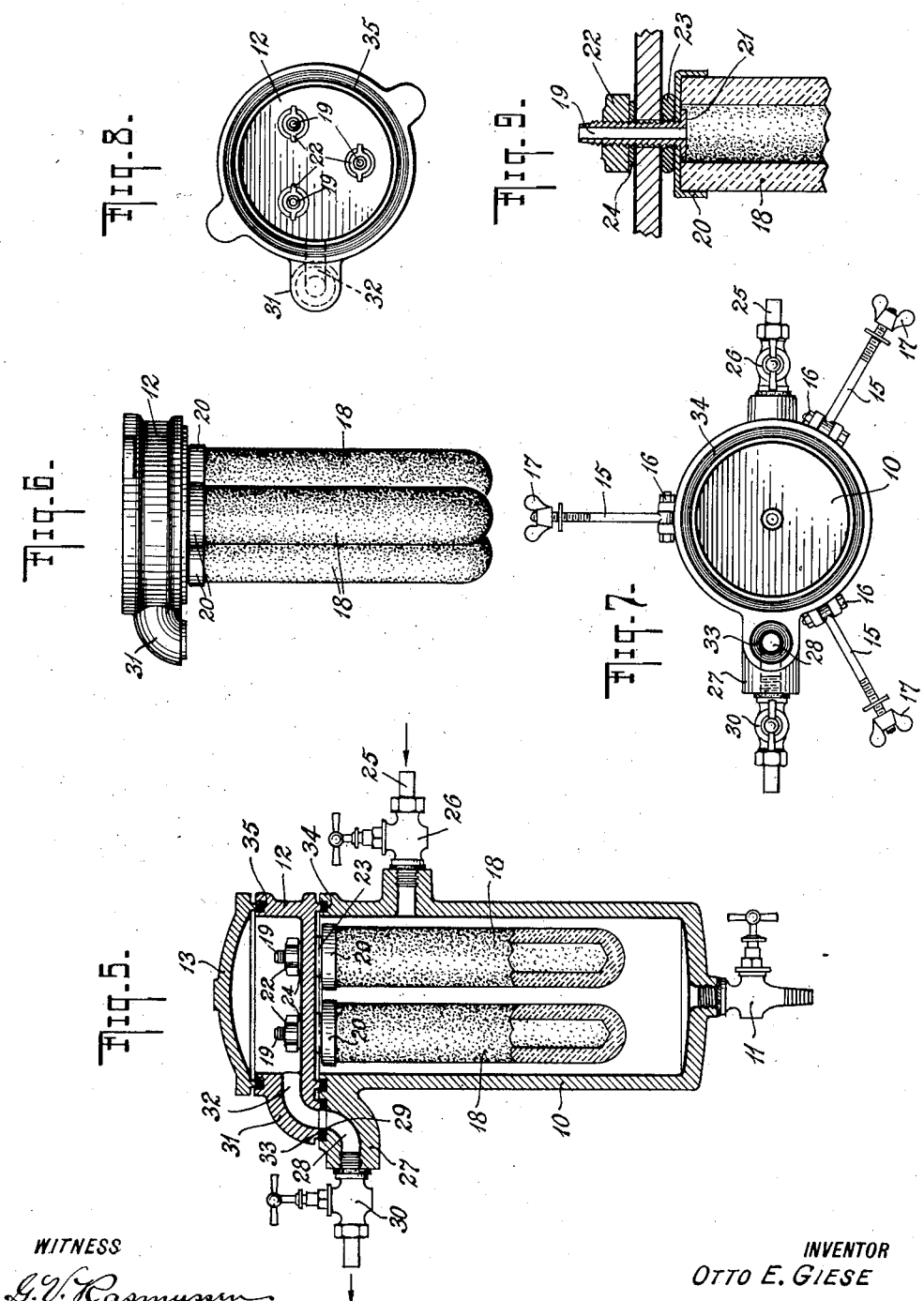
WITNESS
G. V. Rasmussen
INVENTOR
OTTO E. GIESE
BY
Biesen & Schrenk
ATTORNEYS Patented June 21, 1927.

1,632,960

UNITED STATES PATENT OFFICE.

OTTO E. GIESE, OF BROOKLYN, NEW YORK.

FILTER.

Application filed July 20, 1926. Serial No. 123,637.

My invention relates to filters and more particularly to water filters of the type commonly referred to as large supply filters in which the filtering devices comprise cylinders of filtering material suspended from a tray in a container customarily referred to as a pot, suitable provision being made for passing the water to be filtered through said filtering cylinders and for passing the filtered water out of the apparatus. Impurities retained from the water accumulate upon the outside of the filtering cylinders and gradually obstruct the free passage of the water through the pores thereof until the flow of filtered water is interrupted and practically ceases. At this stage, the efficiency of the filtering device is restored by removing the filtering cylinders and cleaning them in a suitable manner, to remove the accumulated impurities. This operation heretofore has required not only a disassembling of the apparatus, but also a breaking of its connection with the system for distributing the filtered water, which has been difficult of accomplishment and requires considerable time and effort. The object of the present invention is to provide a novel arrangement whereby the connection between the filter itself and the aforesaid distributing system or its equivalent need not be broken to permit the aforesaid cleaning operation and whereby such disconnection of elements as is required is reduced to a minimum and is accomplished with a minimum of effort. Other more specific objects will appear from the description hereinafter and the features of novelty will be pointed out in the claims.

In the accompanying drawings which illustrate an example of the invention without defining its limits, Fig. 1 is an elevation of the filter; Fig. 2 is a plan view thereof; Fig. 3 is a view similar to Fig. 1 looking at right angles thereto; Fig. 4 is a horizontal section on the line 4—4 of Fig. 1; Fig. 5 is a vertical section on the line 5—5 of Fig. 3; Fig. 6 is a detail elevation illustrating the tray and the suspended filter cylinders; Fig. 7 is a plan view of the filter pot with the tray removed; Fig. 8 is a corresponding view with the tray in place, and Fig. 9 is a fragmentary section illustrating the method of mounting the filter cylinders upon the tray.

As shown in the drawings, the filter comprises a container, commonly referred to as a pot, 10 of any conventional form closed at its lower end and provided thereat with a drain cock 11 for removing waste from the pot at will, the latter having its upper open end normally closed by means of a tray 12. The tray itself is closed by means of a cover 13 provided with radial lugs 14 for the purpose of accommodating locking bolts 15 pivoted at 16 upon the pot 10 and having their free ends screw-threaded for receiving wing nuts 17 whereby the cover 13 is clamped in place upon the tray 12 and the latter is thereby secured in position upon the pot 10. Cylinders 18 of conventional porous filtering material are suspended in predetermined groups from the tray 12 as shown in Fig. 5, the cylinders in the illustrated example being hollow with closed lower ends and open at their upper ends. The communication between the interior of the cylinders 18 and the interior of the tray 12 is established by means of outlet nozzles 19 which may serve also to secure the cylinders in connection with the tray 12. For this purpose the upper ends of the cylinders, as shown in Fig. 9, are fitted into metallic caps 20 and secured therein in any conventional manner, said caps 20 being provided with axial apertures through which the nozzles 19 project; the inner ends of the nozzles are provided with flanges 21 which engage the inner surfaces of the caps 20, as also shown in Fig. 9. In the assembled condition of the parts, the nozzles 19, which are externally screwthreaded, project upwardly through the bottom of the tray 12 for the reception of nuts 22 which are screwed upon the projecting ends to fix the filter cylinders 18 in place upon the tray. For the purpose of making a fluid-tight joint, it is preferred to interpose a rubber or other yielding washer 23 between the caps 20 and the bottom of the tray 12, washers 24 being also preferably located between the nuts 22 and said tray. In addition to the parts so far described, the filter is provided with an inlet 25 adapted for connection with a source of unfiltered water and communicating with the interior of the pot 10, a valve or cock 26 being provided in this inlet connection for the purpose of controlling the flow of unfiltered water to the pot. As so far described, the filter may be of any conventional form and construction.

As shown in the drawings, the essential features of the invention comprise a novel form of outlet for the filtered water adapted for connection with a system or its equivalent for distributing the filtered water and constructed in a manner to permit the removal of the tray and the filtered cylinders without requiring the connection between the filter and said system or its equivalent to be broken. For this purpose, the pot or container 10 is provided with an outwardly projecting fixture 27 having a passage 28 extending upwardly and terminating in a seat 29. The opposite end of the passage 28 may be screwthreaded for the reception of a control valve or cock 30 adapted for connection with conduits or the like whereby the filtered water is distributed. The tray 12 is provided with a complemental fixture 31 adapted to fit against the seat 29 and having a passage 32 for establishing communication between the passage 28 of the fixture 27 and the interior chamber of the tray 12, as illustrated in Fig. 5. A suitable packing 33 is provided between the opposed portions of the fixtures 27 and 31 to provide a fluid-tight connection between the passages 28 and 32, and similar packings 34 and 35 may be located between the tray and the pot 10 and between the tray and the cover 13 to seal the connections at these points.

In operation, the unfiltered water passes through the inlet 25 into the interior of the pot 10 and thence through the pores of the cylinders 18 to the interior thereof; as the water passes to the interior of the cylinders 18, the impurities contained in said water will be retained upon the exterior surfaces of said cylinders. The filtered water passes from the interior of the latter through the nozzles 19 into the chamber of the tray 12 and thence out of the same through the passages 32, 28, to the distributing system. When the efficiency of the filter is reduced because of the accumulation of the impurities upon the filter cylinders 18 and it is required to clean the latter, this may easily be accomplished in the following manner:

The wing nuts 17 are loosened and the locking bolts 15 are swung out of the lugs 14, as shown in Fig. 7, to release the cover 13, which accordingly may be removed. The release of the cover 13 also releases the tray 12, which, as a result, may be lifted from the pot 10 to thereby lift the cylinders 18 out of said pot and render them accessible for cleaning purposes; this removal of the tray 12 with the cylinders 18 also carries with it the fixture 31, this being accomplished without requiring any disturbance of the connection between the outlet 30 and the distributing system. It will be understood that previous to the removal of the parts as described, the valve 30 has been shut off to prevent filtered water in the system from backing out through the passage 28. After the filter cylinders have been properly cleaned, the tray is replaced in position upon the pot 10 in a manner to restore the connection between the fixtures 31 and 27 and the communication between the passages 28 and 32; the cover 13 is then replaced in position after which the locking bolts 15 are swung into place in the lugs 14 and the thumb nuts 17 are screwed home. The pressure exerted by the thumb nuts 17 upon the lugs 14 forces the cover 13 against the tray 12 and thereby forces the latter against the pot 10 and, at the same time, clamps the fixture 31 against the fixture 27 to bring about a fluid-tight connection between the passages 28 and 32. Disassembling of the filter necessary to permit cleaning of the filter cylinders and the restoration of the parts to their operative positions, may thus be accomplished with a minimum of effort and without requiring the connection between the filter and the distributing system to be disturbed. It will be understood that in some installations, the fixtures 27 and 31 with their passages, may constitute the inlet connection for the unfiltered water which, in such case, would pass out through the connection 25 or its equivalent; the arrangement also permits the cock 11 to be used as an outlet for filtered water in connection with suitable filtering material in which case either the connection 25 or the fixtures 27—31 may constitute the inlet for the water. It will further be understood that the improved arrangement may be incorporated in other forms of filter in which the cleaning operation requires a disassembling of the parts; the manipulation required to disassemble and reassemble the filter needs no skilled operator.

Various changes in the specific forms shown and described may be made within the scope of the claims without departing from the spirit of my invention.

I claim:

1. A filter of the kind described comprising a container, hollow means for suspending a filtering element in said container, a two-part fixture located respectively upon said container and said hollow means and provided with internal passages adapted to communicate with each other and to establish communication between the interior of said hollow means and the exterior of said filter, and fastening devices whereby said hollow means is removably clamped upon said container and said two-part fixture is clamped together in operative position.

2. A filter comprising a container having an inlet for unfiltered water, a chambered closure for closing one end of said container, hollow filtering cylinders suspended from said closure and communicating with the interior thereof, a fixture located upon said container and having an interior channel, a complemental fixture located upon said closure and having a passage arranged to establish communication between the interior of said closure and said channel, and locking devices for detachably securing said cover upon said container and for detachably clamping said fixtures in operative connection with each other.

3. A filter comprising a container closed at the bottom and having its upper end open, an inlet for unfiltered water on said container, a tray normally closing the open end of said container, a group of hollow filter cylinders suspended from said tray and communicating with the interior thereof, a cover normally closing said tray, a fixture forming an integral part of said container and having a channel projecting upwardly and terminating in a seat, a complemental fixture forming an integral part of said tray and adapted to fit against said seat, said second fixture having a passage for establishing communication between said channel and the interior of said tray to provide an outlet for the filtered water, and clamping devices whereby said cover is clamped against said tray and said tray is clamped against said container and whereby the two fixtures are clamped in operative engagement with each other.

In testimony whereof I have hereunto set my hand.

OTTO E. GIESE.